Sept. 24, 1957  F. L. GRANT  2,807,239
BOOSTER DEVICE HAVING A VALVE FOR METERING FLUID FLOW
Filed Jan. 18, 1954  4 Sheets-Sheet 1

INVENTOR.
Frank L. Grant
BY
ATTORNEYS

Sept. 24, 1957 F. L. GRANT 2,807,239
BOOSTER DEVICE HAVING A VALVE FOR METERING FLUID FLOW
Filed Jan. 18, 1954 4 Sheets-Sheet 4

INVENTOR.
Frank L. Grant
BY
*Whittemore Hulbert & Belknap,*
ATTORNEYS

United States Patent Office 2,807,239
Patented Sept. 24, 1957

2,807,239

BOOSTER DEVICE HAVING A VALVE FOR METERING FLUID FLOW

Frank L. Grant, Birmingham, Mich., assignor to Kelsey-Hayes Company, a corporation of Delaware Application January 18, 1954, Serial No. 404,407

6 Claims. (Cl. 121—41)

The invention relates to booster devices and refers more particularly to booster devices for motor vehicle brakes.

The invention has for one of its objects to provide an improved booster device in which the booster has a power piston movable under differential pressure of a fluid medium on its opposite sides and also has a valve construction for metering the flow of the fluid medium to the opposite sides to make the booster device smooth in operation.

The invention has for another object to provide an improved valve construction for metering the flow of the fluid medium.

These and other objects of the invention will become apparent from the following description taken in connection with the accompanying drawings in which—

Figure 1:
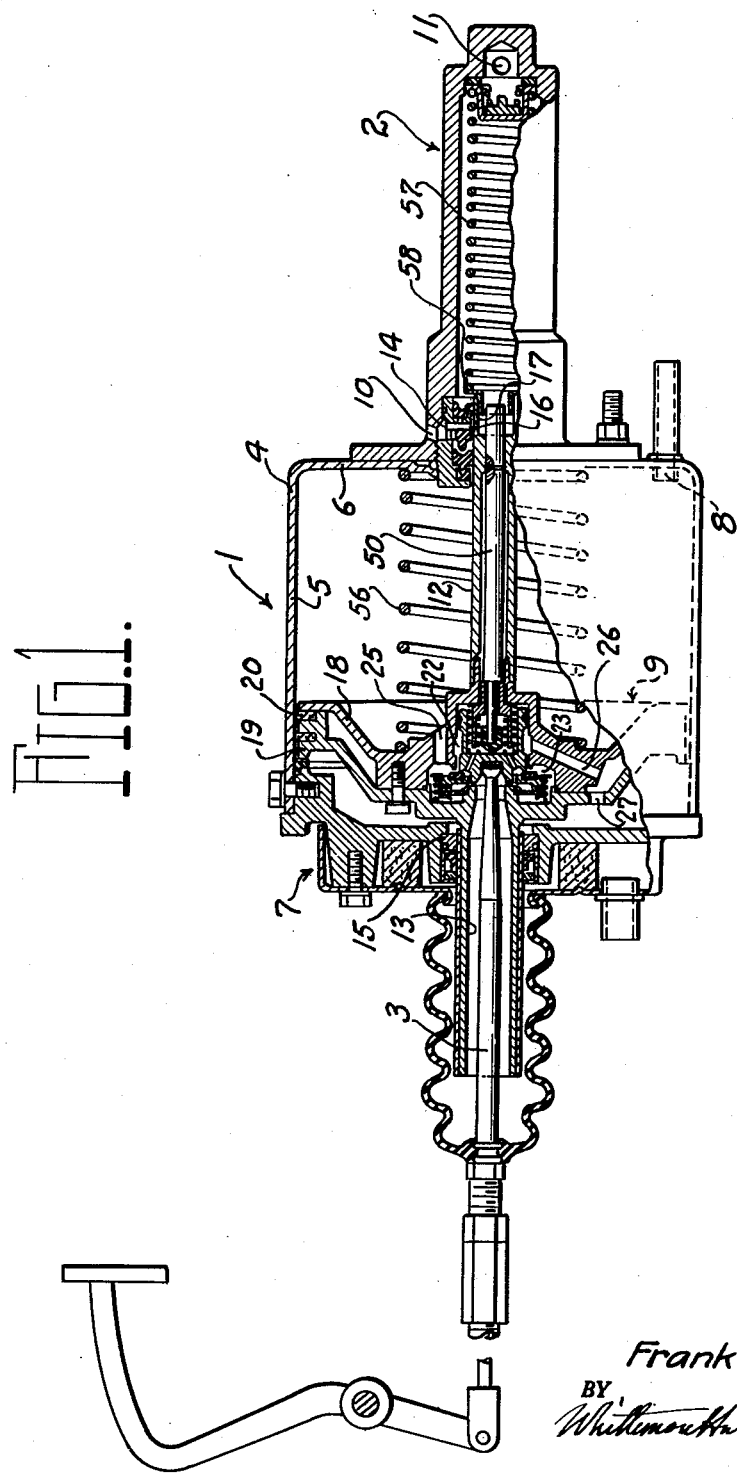
Figure 1 is a sectional view of a booster device embodying the invention.

The booster device comprises the booster 1, the hydraulic cylinder 2, and the manually operable push rod 3. The booster has the casing 4 formed with the cylindrical side wall 5, the integral front end wall 6, and the closure 7 secured to its rear end. The front end wall is provided with a vacuum port 8 which is adapted to be connected to a suitable source of vacuum, such as the intake manifold of an internal combustion engine of an automotive vehicle. The booster also has the power piston 9 reciprocable within the casing and forming therewith a vacuum chamber at the front side of the power piston and a variable pressure chamber at the rear side of the power piston. The hydraulic cylinder 2 is secured to the front end wall 6 of the casing and has the braking liquid inlet port 10 at its rear end adapted to be connected to a reservoir, and the braking liquid outlet port 11 at its front end adapted to be connected to a hydraulic motor, such as a wheel cylinder, for operating a brake of the automotive vehicle.

The power piston 9 is guided by the axially aligned tubular power plunger 12 and tubular stem 13, which respectively extend forwardly and rearwardly from the power piston and slidably engage a bearing 14 at the rear end of the hydraulic cylinder 2 and a bearing 15 in the closure 7. The bearing 14 is provided with the port 16 communicating with the port 10. The power plunger extends into the hydraulic cylinder 2 and has near its front end the port 17 which in the off or retracted position of the power plunger registers with the port 16 and in the operative or extended position is located forwardly of and sealed from this port so that communication of the hydraulic cylinder with the reservoir is cut off.

The power piston 9 comprises the front and rear sections 18 and 19, respectively, secured intermediate their inner and outer peripheries to each other and retaining at their outer peripheries the sealing ring 20 which slidably engages the side wall 5. The front section has the rearwardly extending annular boss 21 abutting and secured to the rear section, the portions of the sections between the boss and the sealing ring retaining portions being axially spaced from each other. The power piston is formed with a central valve chamber by providing the front section 18 with the rearwardly opening reduced chamber portion 22 and the enlarged chamber portion 23 and by providing the rear section 19 with the annular chamber portion 24. The front section 18 is provided with the axially extending vacuum passages 25 radially outwardly of the reduced chamber portion 22 placing the enlarged chamber portion 23 in communication with the vacuum chamber or interior of the casing 4 at the front side of the power piston 9. The front section is also provided with the generally radially extending air passages 26 leading from the reduced chamber portion 22 to the space between the front and rear sections radially outwardly of the annular boss 21. The rear section 19 is provided with the axially extending air passages 27 placing this space in communication with the variable pressure chamber or interior of the casing 4 at the rear side of the power piston 9. The rear section 19 is formed at its inner periphery with the forwardly extending annular flange 28, which has at its front end the air inlet port 29.

The valve construction for controlling the operation of the booster comprises the vacuum valve 30, the air valve 31, and the floating seal 32 engageable with the vacuum and air valves. The vacuum valve is formed by an annular rib extending rearwardly from the side wall of the reduced chamber portion 22 into the enlarged chamber portion 23 and having a seat at its rear end adapted to make sealing contact with the floating seal. The air valve is a cup-shaped piston co-axial with and extending within the reduced chamber portion 22 and having the side wall 33, the end wall 34, and the annular flange or hub 35 extending rearwardly from and of smaller diameter than the end wall. The front end and rear end portions of the side wall 33 are enlarged and slidably engage the side wall of the reduced chamber portion 22, there being an O-ring 36 between the front end portion and side wall and the rear end portion having the axial grooves 37 providing air passages between the rear end portion and side wall. The end wall 34 has the rearwardly extending annular rib 38 concentric with the annular rib 30 and immediately adjacent the grooves 37 and having a seat at its rear end adapted to make sealing contact with the floating seal. The end wall also has the generally axial passages 39 leading from the space between the annular flange or hub 35 and the annular rib 38 to the interior of the air valve. The end wall further has the central axially extending restricted air passage 40 and the communicating radially extending passage 41 leading to the reduced chamber portion 22. The annular flange or hub 35 has secured to its rear end the annular seal 42, preferably formed of rubber, adapted to abut the rear end of the annular flange 28 and seal the air inlet port 29 in the off position of the air valve. The air valve is resiliently urged rearwardly by the coil spring 43 within the air valve 31 and abutting its end wall 34 and the end wall of the reduced chamber portion 22. The floating seal 32 is located within the enlarged chamber portion 23 and annular chamber portion 24. This seal is annular and comprises the ring 44, the annular sealing member 45 and the flexible diaphragm 46 secured to the ring 44 and the annular flange 28. The annular sealing member 45 is preferably formed of rubber and is a disk secured to and extending forwardly from the ring 44 and adapted to engage the seats of the ribs 30 and 38. The floating seal is urged axially forwardly by means of the coil spring 47 abutting the radial wall portion of the annular chamber 24 and a peripheral flange of a cup-shaped member 48 which encircles the ring and diaphragm and abuts the rear side of the diaphragm.

To transmit hydraulic pressure created within the hydraulic cylinder 2 to the push rod 3 and thereby impart feel to the operator of the booster device, there are the cup-shaped reaction member 49 and the reaction rod 50. The reaction member 49 has the cup-shaped body 51 located within the reduced chamber portion 22 and inside the coil spring 43 and opening toward the end wall 34 of the air valve. The reaction member 49 also has the hub 52 extending forwardly from the bottom wall of the body through the end wall of the reduced chamber portion 22. A suitable sound deadening disk 53 is located between the bottom wall of the body and the end wall of the reduced chamber portion 22. The reaction rod 50 extends within the power plunger 12 and through the end wall of the reduced chamber portion and the bottom wall of the body 51 and within the body. The front end of the reaction rod is exposed to the braking liquid in the hydraulic cylinder 2 and the rear end of the reaction rod carries the seal 54. This seal is cup-shaped and preferably formed of rubber and its bottom is engageable with the end wall 34 of the air valve and is adapted to close the axial passage 40. 55 is a coil spring extending between the side walls of the body 51 and the seal 54 and abutting the end wall 34 and the bottom wall of the reaction member 49, and resiliently urging the air valve 31 rearwardly and the reaction member 49 forwardly. This coil spring controls the hydraulic pressure in the hydraulic cylinder 2 that must be exerted upon the reaction rod 50 to overcome this spring and move the reaction member 49 rearwardly to first seat the seal 54 and then flatten the same and finally engage the rear end of the side wall of the body 51 with the end wall 54 of the air valve.

Both of the coil springs 43 and 55 control the forward force that must be exerted upon the push rod 3 to move the air valve 31 forwardly to start the operation of the booster. For retracting the power piston 9 and the power plunger 12, there are the coil springs 56 and 57, the first being between the front end wall 6 of the casing 4 and the power piston 9, and the second being within the hydraulic cylinder 2 between the front end of the cylinder and the cup-shaped member 58.

Figure 4:
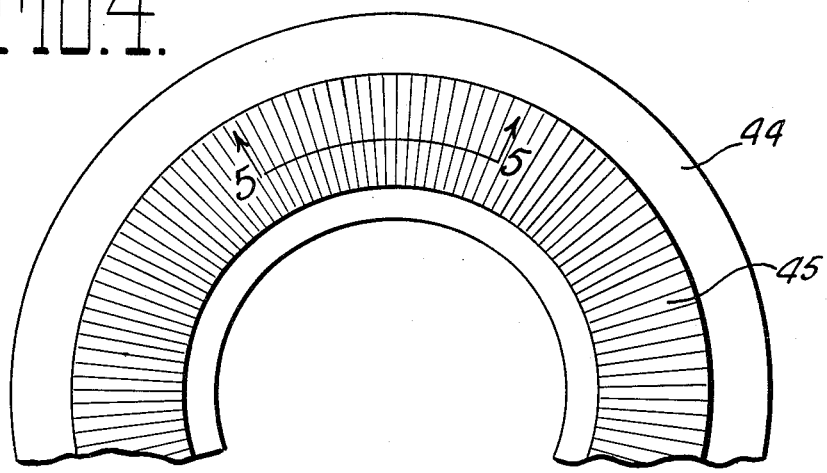
Figure 4 is an end view of a part of the valve construction in its normal state.
Figure 5:
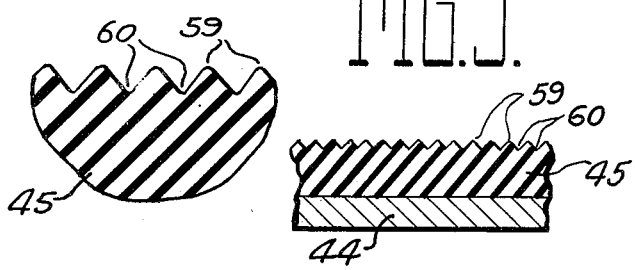
Figure 5 is a cross section on the line 5—5 of Figure 4.
Figures 6, 7:
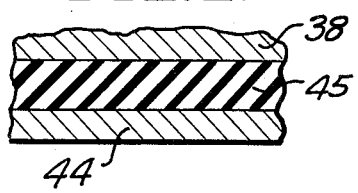
Figure 6 is a similar view on the line 6—6 of Figure 2.
Figure 7 is an enlarged sectional view of a portion of Figure 5.

For the purpose of making the booster operate smoothly, the valve construction is made to meter the flow of air to the vacuum chamber or the interior of the casing 4 at the front side of the power piston 9 and to the variable pressure chamber or the interior of the casing 4 at the rear side of the power piston 9. In detail, as shown particularly in Figures 4 and 5, the annular sealing member 45 has its front face radially corrugated to provide the alternate radial ridges 59 and grooves 60. These ridges are deformable from their tips to their roots by the ribs 30 and 38 so that during the relative movement of the annular seal and either of the annular ribs 30 or 38 toward each other, the ridges are progressively deformed from their tips to their roots and the grooves between the ridges are progressively made smaller until sealing contact is made throughout the complete circumference of either rib as shown in Figure 6. Also, as the sealing member and either of the ribs are relatively moved away from each other from complete sealing contact, the corrugation ridges and grooves progressively return to their original form or shape. In the first instance, the flow of air is metered to progressively decrease from the time either rib contacts the tips of the corrugation ridges to the time the complete seal is made. In the second instance, the flow of air is metered to progressively increase from the time either rib moves away from its complete sealing contact to the time the rib is free of the corrugation ridges.

Figure 2:
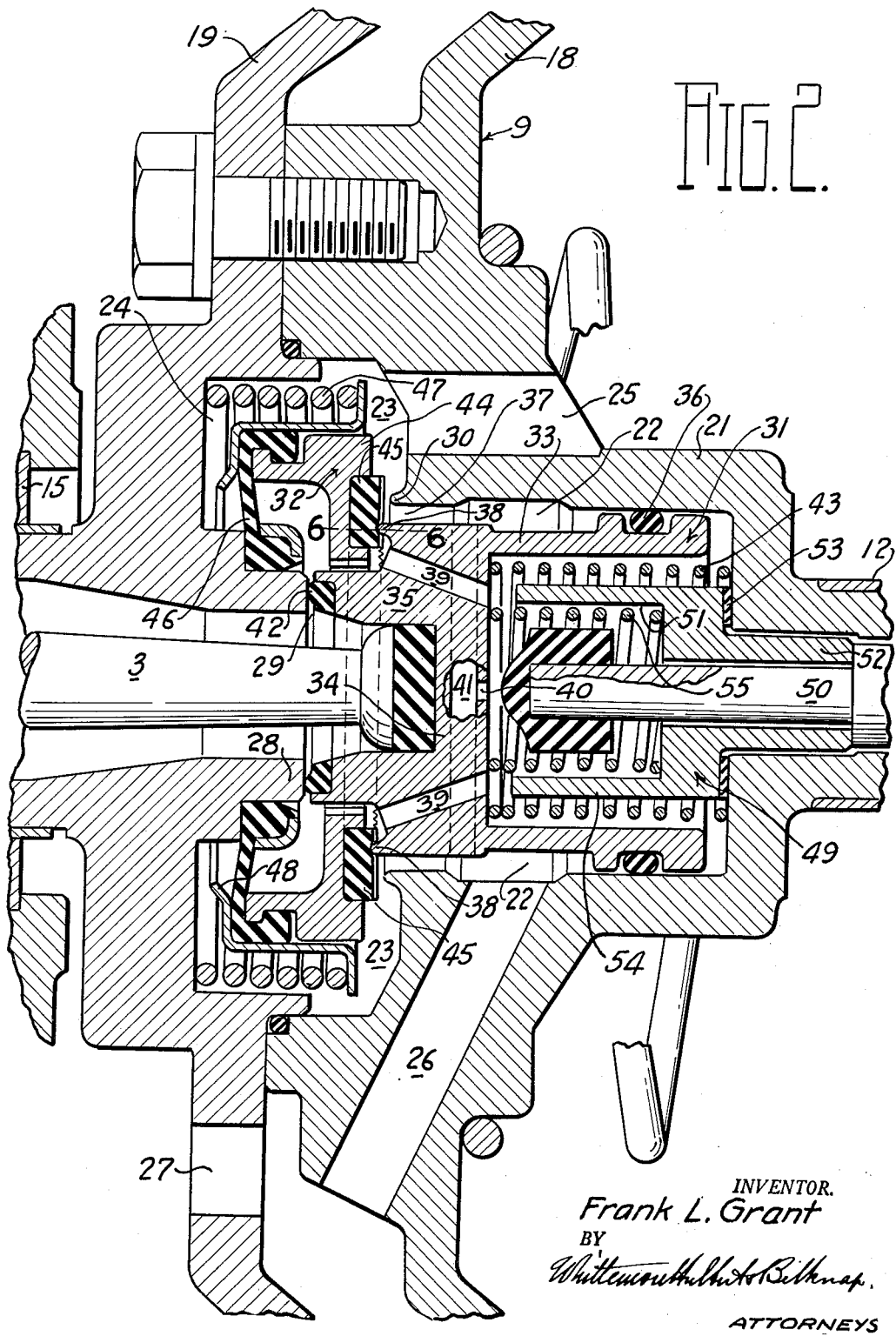
Figures 2 and 3 are enlarged views of a portion of Figure 1 showing the parts in different positions.

Assuming the parts to be in the off position, as shown in Figures 1 and 2, and the internal combustion engine of the automotive vehicle to be running, the air inlet port 29 is sealed and the vacuum chamber or interior of the casing 4 at the front side of the power piston 9 is under vacuum, and this same pressure is present within the valve chamber of the piston and the variable pressure chamber or the interior of the casing 4 at the rear side of the power piston 9.

Figure 3:
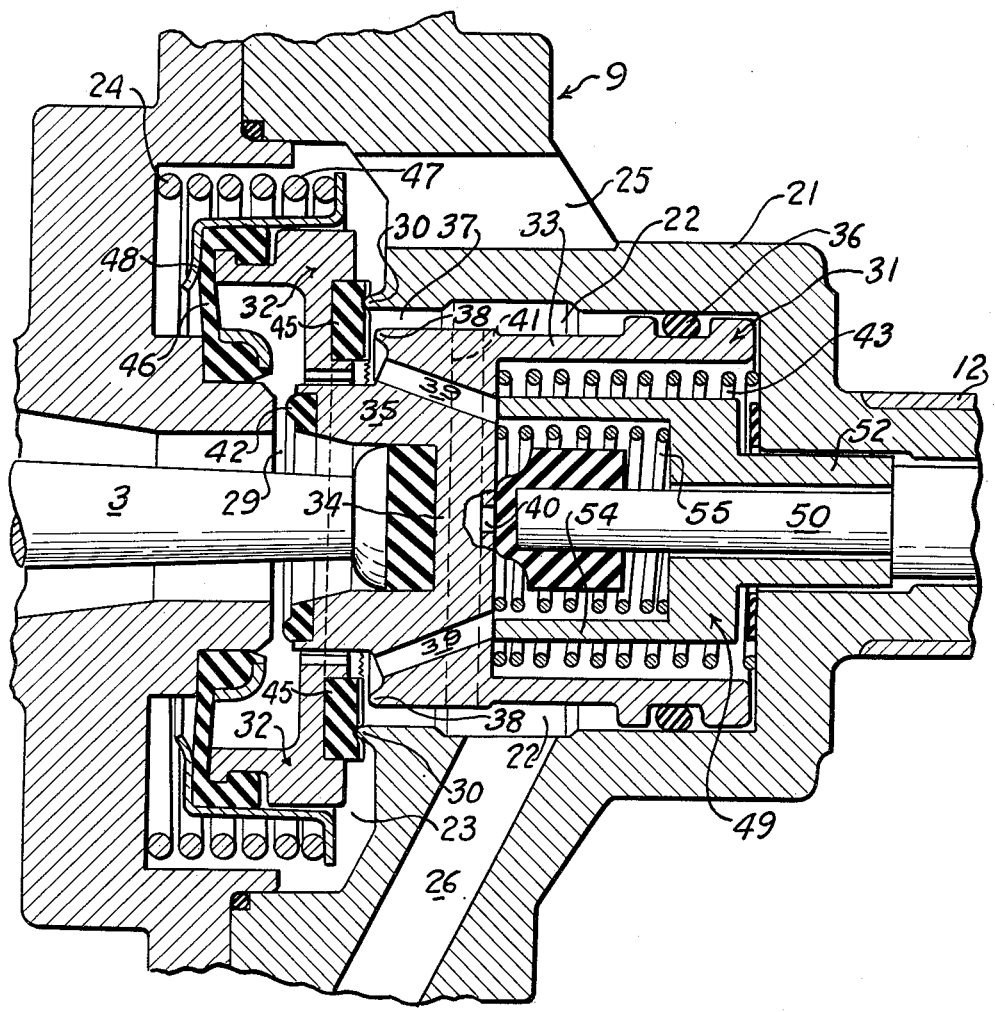

Upon forward movement of the push rod 3 against the resistance of the coil springs 43 and 55, the air valve 31 is moved forwardly and the seal 42 opens the air inlet port 29 so that air is allowed to pass through this inlet port into the interior of the air valve 31. During the initial portion of this forward movement, the floating seal 32 remains in contact with the seat of the rib 38 of the air valve and all air entering through the air inlet port passes through the generally axial passages 39, the axial passage 40 and the radial passage 41 to the reduced chamber portion 22. Some of the air is withdrawn past the vacuum valve 30 and through the vacuum passages 23 into the vacuum chamber or the interior of the casing 4 at the front side of the power piston 9 and the remainder of the air passes through the passages 26, the intermediate space between the front and rear sections 18 and 19 and the passages 27 to the variable pressure chamber or the interior of the casing 4 at the rear side of the power piston 9. As forward movement of the push rod 3 is continued, the air valve 31 is moved forwardly and the floating seal 32 is moved forwardly by its spring 47 moving the annular sealing member 45 against the seat of the rib or vacuum valve 30 at which time the radially outer portions of the corrugation ridges 59 of the sealing member are progressively deformed from their tips to their roots and the corresponding portions of the corrugation grooves 60 are progressively made smaller, thereby progressively decreasing the flow of air to the vacuum chamber or the interior of the casing 4 in front of the power piston 9 until the rib or vacuum valve 30 makes sealing contact throughout its complete circumference with the sealing member. Then upon continued forward movement of the air valve 31 by the push rod 3, the rib 39 which had been in complete sealing engagement with the sealing member 45 moves away from the sealing member, which remains in full sealing engagement with the rib 30, and the radially inner portions of the corrugation ridges 59 and grooves 60 return to their original form or shape gradually increasing the area of the grooves, Figure 3 showing the parts at this time.

As a result, during the forward movement of the push rod 3, above described, the valve construction meters the flow of air to the vacuum chamber at the front side of the power piston while shutting off the flow. Also, the valve construction then meters the flow of air to the variable pressure chamber at the rear side of the power piston and then provides for free flow, during which time the air pressure is increased sufficiently to initiate forward movement of the power piston. During this forward movement, the braking liquid port 17 is cut off after which the power plunger 12 creates hydraulic pressure within the hydraulic cylinder 2. When this hyraulic pressure is raised sufficiently to overcome the coil spring 55, the reaction rod 50 and cup-shaped reaction member 49 are moved rearwardly, first closing the axial passage 40 by the seal 54 and then flattening the bottom of the seal 54 and finally engaging the rear end of the side wall of the cup-shaped reaction member 49 with the end wall 34 of the air valve. As a result, the hydraulic pressure in the hydraulic cylinder is transmitted to the foot pedal for operating the push rod and creates feel.

Upon release of pressure on the push rod 3, relative movement between the power piston 9 and the air valve 31 occurs with the result that the air valve engages the sealing member 45 disengaging the same from the rib or vacuum valve 30 after which the seal 42 is engaged with the front end of the annular flange 28. At this time the parts are in their off positions, as shown in Figures 1 and 2.

With the above construction, the booster operates smoothly by reason of the metering of air to the vacuum and variable pressure chambers respectively at the front and rear sides of the power pistons. Furthermore, the valve construction for effecting the metering is very simple.

What I claim as my invention is:

1. In a booster for a brake having a casing, and a power piston within the casing and forming therewith a vacuum chamber and a variable pressure chamber, the power piston having a valve chamber, the improvement which comprises a valve construction within the valve chamber for metering the flow of air to the vacuum and variable pressure chambers comprising a rigid annular rib fixed relative to the power piston, a co-axial rigid annular rib of smaller diameter and spaced from said first mentioned rib and movable axially relative thereto, and a co-axial floating seal having a resilient radially corrugated annulus engageable with said ribs with the radial corrugation ridges progressively deformable from their tips to their roots by said ribs upon relative movement of said seal and ribs toward each other to progressively decrease the flow of air across said ribs and finally to provide a seal against the flow of air across said ribs, and progressively returnable to normal form upon relative movement of said seal and ribs away from each other to progressively increase the flow of air across said ribs.

2. In a booster for a brake having a casing, and a power piston within the casing and forming therewith a vacuum chamber and a variable pressure chamber, the power piston having a valve chamber, the improvement which comprises a valve construction within the valve chamber for metering the flow of air to the vacuum and variable pressure chambers comprising a rigid annular rib fixed relative to the power piston, a co-axial rigid annular rib of smaller diameter and spaced from said first mentioned rib and movable axially relative thereto, and a co-axial floating seal having a resilient radially corrugated annulus engageable with said ribs with the radial corrugation ridges progressively deformable from their roots by said ribs upon relative movement of said seal and ribs toward each other to progressively decrease the flow of air across said ribs and finally to provide a seal against the flow of air across said ribs, and progressively returnable to normal form upon relative movement of said seal and ribs away from each other to progressively increase the flow of air across said ribs, said corrugation ridges being V-shaped.

3. In a booster for a brake having a casing, and a power piston within the casing and forming therewith a chamber, the improvement which comprises means for metering the flow of air to the chamber including a member having an annular seat, a cooperating member having a resilient radially corrugated annulus engageable with said seat with the radial corrugation ridges progressively deformable from their tips to their roots by said seat upon relative movement of said members toward each other to progressively decrease the flow of air across said seat and finally to provide a seal against the flow of air across said seat, and progressively returnable to normal form upon relative movement of said members away from each other to progressively increase the flow of air across said seat.

4. In a booster for a brake having a casing, and a power piston within the casing and forming therewith a vacuum chamber and a variable pressure chamber, the power piston having a valve chamber, the improvement which comprises a valve construction within the valve chamber for metering the flow of air to said vacuum and variable pressure chambers comprising an annular rib, a coaxial annular rib of smaller diameter and spaced from the first-mentioned rib, a member having a resilient radially corrugated annulus coaxial with said ribs and engageable with the latter, means supporting said ribs and member for relative movement toward and away from each other to effect the engagement of said annulus by said ribs, the radial corrugation ridges of said annulus being progressively deformable from their tips to their roots by said ribs upon relative movement of said member and ribs toward each other to progressively decrease the flow of air across said ribs and finally to provide a seal against the flow of air across said ribs, and progressively returnable to normal form upon relative movement of said member and ribs away from each other to progressively increase the flow of air across said ribs.

5. A valve construction for metering the flow of a fluid medium comprising a pair of members respectively having rigid annular ribs of different diameters arranged coaxially with respect to each other, a cooperating member having a resilient radially corrugated annulus coaxial with said ribs and engageable with the latter, means supporting the first-mentioned members and said cooperating member for relative movement toward and away from each other to effect the engagement of said annulus by said ribs, the radial corrugation ridges of said annulus being progressively deformable from their tips to their roots by said ribs upon relative movement of said first-mentioned members and said cooperating member toward each other to progressively decrease the flow of fluid across said ribs and finally to provide a seal against the flow of fluid across said ribs, and progressively returnable to normal form upon relative movement of said first-mentioned members and said cooperating member away from each other to progressively increase the flow of fluid across said ribs.

6. A valve construction for metering the flow of a fluid medium comprising a member having an annular seat, a cooperating member having a resilient radially corrugated annulus engageable with said seat, means supporting said members for relative movement toward and away from each other to effect engagement of said annulus by said seat, the radial corrugation ridges of said annulus being progressively deformable from their tips to their roots by said seat upon relative movement of said members toward each other to progressively decrease the flow of fluid across said seat and finally to provide a seal against the flow of fluid across said seat, and progressively returnable to normal form upon relative movement of said members away from each other to progressively increase the flow of fluid across said seat.

References Cited in the file of this patent

UNITED STATES PATENTS

| 862,967 | Hawkyard | Aug. 13, 1907 |
| 1,687,047 | Trail | Oct. 9, 1928 |
| 1,879,598 | Bragg | Sept. 27, 1932 |
| 2,232,974 | Roy | Feb. 25, 1941 |
| 2,331,238 | Schnell | Oct. 5, 1943 |
| 2,511,733 | Morrison | June 13, 1950 |
| 2,685,170 | Price | Aug. 3, 1954 |
| 2,735,268 | Stelzer | Feb. 21, 1956 |

FOREIGN PATENTS

| 682,587 | France | Feb. 17, 1930 |